F. STELLAR.
INSECT GATHERING AND DESTROYING MACHINE.
APPLICATION FILED FEB. 24, 1917.
1,279,476.
Patented Sept. 17, 1918.
2 SHEETS—SHEET 1.
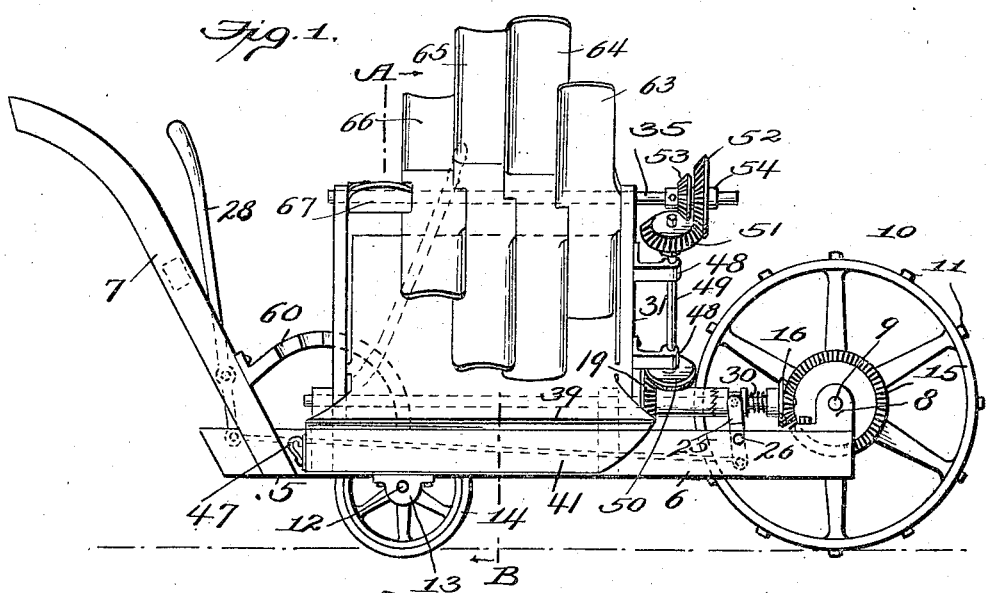

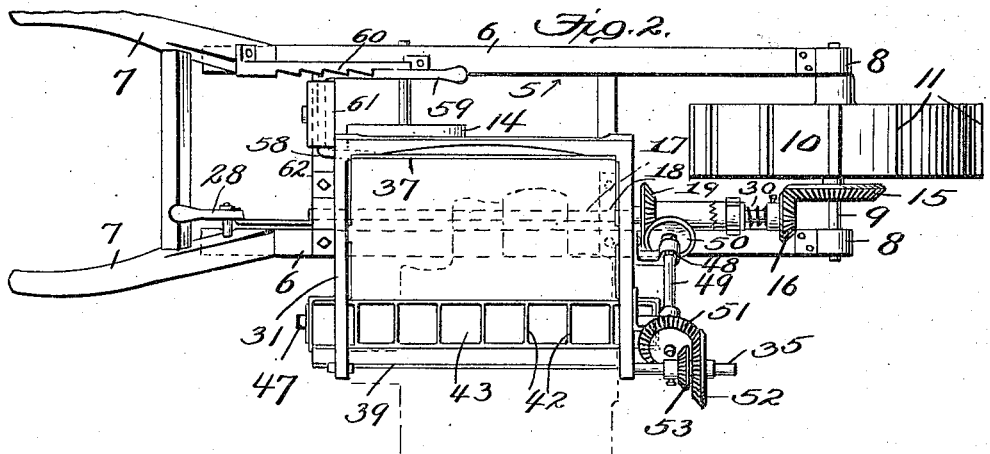
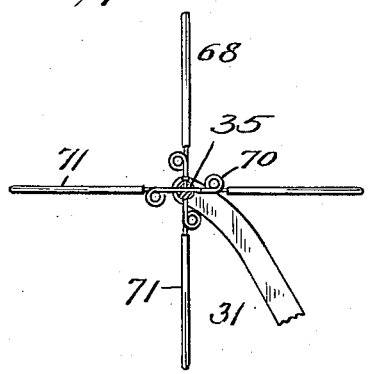
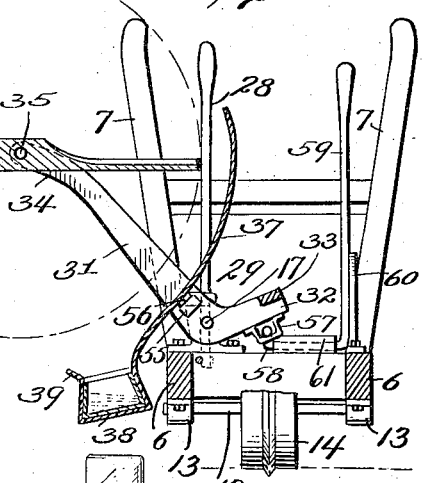
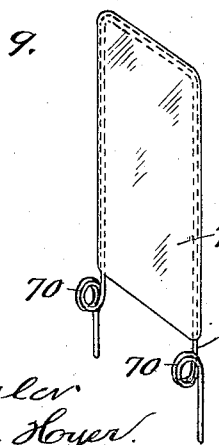
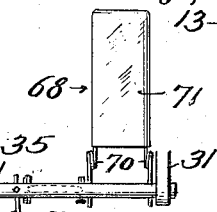

UNITED STATES PATENT OFFICE.

FREDERICK STELLAR, OF BIRMINGHAM, ALABAMA.

INSECT GATHERING AND DESTROYING MACHINE.

1,279,476.  Specification of Letters Patent.  Patented Sept. 17, 1918.

Application filed February 24, 1917. Serial No. 150,783.

*To all whom it may concern:*

Be it known that I, FREDERICK STELLAR, a citizen of the United States, residing at Birmingham, in the county of Jefferson and State of Alabama, have invented new and useful Improvements in Insect Gathering and Destroying Machines, of which the following is a specification.

This invention relates to machines for removing and destroying boll weevils, potato bugs and other insects from growing plants, vines, and vegetation generally, and the primary object of the same is to provide means for imparting to the plants or vines successive vibratory or shaking movements and at the same time drawing or deflecting the plants or vines toward a destroying means or insect gathering device to insure a thorough elimination of bugs or insects from plants and vines by a positive operation without injury to the bolls, branches or foliage of the plants or vines. A further object of the invention is to provide a machine for positively removing boll weevils, potato bugs and other insects from plants or vines by mechanism which is simple in construction and operation and easily controlled and manipulated to meet various contingencies that may arise in carrying out the operation sought to be performed.

With these and other objects and advantages in view the invention consists in the preferred construction and arrangement of the several parts which will be more fully hereinafter described and claimed.

In the drawings:

Figure 1 is a side elevation of a machine embodying the features of the invention.

Fig. 2 is a top plan view of the improved machine.

Fig. 3 is a transverse vertical section taken in the plane of the line A—B, Fig. 1, looking toward the front of the machine.

Fig. 4 is a section taken on the same line A—B, Fig. 1, looking toward the rear of the machine.

Fig. 5 is an enlarged longitudinal vertical section of the boll weevil or bug receptacle or trough and a portion of the support therefor.

Fig. 6 is a detail sectional elevation of a portion of the gearing and operating means therefor and particularly illustrating a clutch organization on the main drive shaft.

Fig. 7 is a detail view in cross-section of the feeder shaft and beaters illustrated in elevation and showing a modification of said beaters.

Fig. 8 is a plan view of the beaters and shaft as shown by Fig. 7.

Fig. 9 is a detail perspective view of one of the beaters as shown by Figs. 7 and 8.

The numeral 5 designates a main frame comprising opposite side bars 6 to the rear extremities of which handles 7 are attached. In suitable bearings 8 at the front ends of the side bars 6 an axle 9 is mounted to freely rotate, and on this axle a ground wheel 10 is secured and provided with tractive ribs 11, the said ground wheel serving as the prime operating means for the mechanism which will be hereinafter explained. In rear of the ground wheel 10 and mounted on a suitable axle 12 held in opposite bearings 13 is an intermediate follow or furrow wheel 14, which not only supports the machine but also operates to keep the latter in central position with relation to a furrow or run-way in which the machine is disposed to operate. On the axle 9 a gear 15 is secured for the purpose of transmitting motion from the said axle to a pinion 16 with which it is held in continual mesh. The gear 15 and pinion 16 are of the beveled type, the pinion 16 being held on the front end of a main drive shaft 17 extending along the one side bar 6 and mounted in suitable bearings 18. On the shaft 17 a transmission beveled gear 19 is mounted and has an elongated hub or sleeve 20 with clutch teeth 21 in the end thereof opposite that at which the gear 19 is located, as clearly shown by Fig. 6. The gear 19 and sleeve 20 are loosely mounted on the shaft 17 and are held against longitudinal displacement by a set-collar 22. On the shaft 17 in advance of the sleeve 20 of the transmission gear 19 a clutch sleeve 23 is splined and is grooved as at 24 for engagement therewith of a clutch lever 25 intermediately fulcrumed, as at 26, to the inner side of the bar 6 adjacent thereto. To the lower end of the lever 25 a connecting rod 27 is secured and runs rearwardly and is attached to a shifting lever 28 fulcrumed on the inner side of one of the handles 7, as clearly shown by Fig. 2, and coöperating with a toothed segment 29 or an analogous device to hold the said lever in its desired adjusted position. Between the beveled pinion 16 and the clutch sleeve 23 a spring 30 surrounds the shaft 17 and operates to force the said clutch sleeve into engagement with the sleeve 20 of the transmission gear 19. It will be understood that the lever 25 is a clutch shifting lever operable by the connecting rod 27 and lever 28, and when the lever 28 is drawn rearwardly the shifting lever 25 is operated to force the clutch sleeve 23 into engagement with the gear sleeve 20 and transmit motion from the shaft 17 to the sleeve 20 and gear 19 or to clutch the said latter gear to the shaft. At any time desired the clutch sleeve 23 may be released by operating the lever 28 in the opposite direction and which will result in a forward movement of the said clutch sleeve on the shaft 17 against the resistance of the spring 30. A gathering frame is mounted to swing on the shaft 17 and comprises opposite end bars 31 having angular extremities 32 extending inwardly over the upper portion of the frame of the machine, as shown by Figs. 3 and 4, the angular extremities being connected by a coupling bar 33 which is secured thereto. The end bars 31 each has an upper curved extremity 34, and in these extremities a beater shaft 35 is mounted to rotate and carries thereon a beater 36 between the said end bars 31. These end bars or arms 31 will be shaped and dimensioned to the best advantage for the purpose for which they have been devised, and carried between and secured to these end bars or arms is a boll weevil or bug repository and destroying means consisting of an upwardly extending curved metal shield or guard 37 projecting sufficiently at its upper edge relatively to the beater 36 to prevent an overthrow of the weevils or bugs above the said shield or guard. The shield or guard 37 continues into or has formed therewith a lower support 38 which is preferably of trapezoidal form in cross-section and provided with an upwardly inclined terminating lip or flange 39. The support 38 is open at its top portion, and extending thereover are wires 40 which prevent cotton or other material or foliage from being thrown down into the support and particularly into a trough or receptacle 41 slidably mounted in the support, as clearly shown by Fig. 5. The trough or receptacle 41 is fully open at the top and is longitudinally divided by cross-partitions 42 into distinct compartments 43 in which a destructive fluid, such as coal oil, is disposed in suitable quantity, as at 44. The object of the compartments containing distinct quantities of the destructive fluid is to prevent the said fluid from splashing out or having a surging action due to the adjustment of the support and trough or receptacle, or when the machine is traveling and performing its desired function. This partitional construction of the trough or receptacle 41 and the retention of smaller quantities of the fluid in the compartments 43 will also result in an economical use of the said fluid. The forward end 45 of the trough or receptacle 41 and the similar end 46 of the support 38 are upwardly inclined so as to provide for a convenient association of the forward extremities of these two devices when the trough or receptacle is pushed fully into the support and also to prevent sticking of the two forward ends of the receptacle and support when it is desired to withdraw the trough or receptacle 41 to empty the same. The inclined forward end 46 of the support is also particularly advantageous in the operation of the machine in permitting said support to pass over growths or vegetation that may be in the way of movement of the machine, as for instance weeds, and thereby avoid material obstruction to progress of the machine as the weeds or other growths will be caused to pass downwardly under the support 38 by reason of the inclination of the front end 46 thereof, and it is obvious that the front end of the trough or receptacle 41 must be correspondingly shaped in order to permit a close fitting of the two ends. The rear end of the trough or receptacle 41 is provided with a suitable handle or grip 47 for convenience in operating the same relatively to the support 38. The shield, guard or fender 37 is of such contour and inclination that the boll weevils or bugs thrown over against the same by the beater 36 will be caused to slide downwardly into the trough or receptacle 41 and the lip or flange 39 insures the guidance of the weevils or bugs into the trough and prevents these insects from falling over the inner side of the support. The trough or receptacle 41 has inwardly and upwardly inclined or converged sides, as shown by Fig. 3, and the support 38 has similarly shaped sides. The sides of the trough inclined as specified prevent splashing and overrunning of the contents of the trough at the said sides, and this advantageous structure, together with the imperforate partitions 42 which prevent all the contents of the trough from running or surging toward opposite ends therof, provides for a practical retenion of the liquid in the trough as well as an economical use thereof. By means of the partitions, the gathered insects are also confined in limited spaces and will not all settle at one end or the other of the trough. The shape of the trough and support, or the inwardly inclined sides of the support co-acting with the similarly inclined sides of the trough, prevents displacement of the trough during movement of the machine, particularly in traveling over ruts or depressions.

The forward bar or arm 31 has two bracket bearings 48 secured thereto, and therein a counter-shaft 49 is mounted and carries a beveled pinion 50 on the lower end and a similar pinion 51 on the upper end thereof. The lower pinion 50 is held in continual mesh with the beveled gear 19, and the upper pinion 51 is adapted to mesh with either one of two gears 52 or 53 which are also of the beveled type and carried by a sleeve 54 adjustable on the forwardly projected extremity of the beater shaft 35. The upper pinion 51 may be shifted on its shaft 49 to dispose it for practical mesh with the smaller gear 53, the said shaft 49 being shown long enough in Fig. 1 to permit such shifting movement of the pinion 51. By means of the mechanism just described motion is transmitted from the main drive shaft 17 through the medium of the beveled gear 19 to the beater shaft 35 when the clutch sleeve 23 is in engagement with the sleeve 20. When the said clutch sleeve 23 is released from the sleeve 20 the beater shaft 35 and beater carried thereby will cease to rotate, the operation of the beater and its shaft being readily controlled through the movement of the lever 28. The shield, guard or fender 37 and support 38 with the trough 41 are held in engagement with the bars or arms 31 for adjustment uniformly with the latter, and as a convenient means for separably holding the shield, fender or guard and support and trough in connection with said bars or arms the latter are provided with sockets 55 on their inner opposing sides to receive tongues 56 at the forward and rear edges of the shield, guard or fender, as clearly shown by Figs. 3 and 4.

The bars or arms 31 and the parts carried thereby, including the beater shaft 35 and beater 36, may be adjusted inwardly and outwardly at different angles to accommodate the position and height of the plants or vines to be operated upon or from which it is desired to remove or eliminate boll weevils or bugs, Figs. 3 and 4 showing two different angular positions of adjustment. To accomplish this adjustment the inner angular extremity 32 of the rear bar or arm 31 has a loop or stirrup 57 secured thereto and engaged by an angular crank extremity 58 of a lever 59 mounted adjacent to a locking segment 60, said lever 59 being in a position opposite that of the lever 28 and whereby an operator may control the lever 28 with one hand and the lever 59 with the other hand and at the same time maintain a grip on at least one of the handles 7. The cranked extremity 58 is of right-angular contour, as shown in dotted and full lines by Fig. 2, and the transversely extending portion thereof is mounted in a bearing 61 held on a cross-support 62 between the side bars 6 of the main frame. By shifting the lever 59 forwardly and rearwardly the angular extremities 32 of both bars or arms 31 are uniformly moved or drawn downwardly toward the main frame or elevated with relation to the latter and the said bars or arms, together with the parts carried thereby as hereinbefore explained, will be moved in a similar manner and the angle thereof varied as may be desired and found necessary to effect a boll weevil or bug removing operation to the best advantage relatively to the plants or vines treated.

The beater mounted upon the shaft 35 may be either one of two forms, but both forms embody the same principle of operation or have means or components so disposed as to effect successive vibratory action relatively to the bolls of cotton plants or the branches of vines with an easy action or sweep and whereby each boll engaged or portion of a plant or vine treated will be thoroughly shaken to dislodge the weevils or bugs and throw them against the shield, guard or fender 37. In the form of the beater 36 as shown by Figs. 1, 2, 3 and 4 a plurality of blades 63, 64, 65, 66 and 67 is mounted on the shaft 35 at different angles relatively to each other, with the edges thereof overlapping, as shown by Fig. 1, to obviate the passage of insects between the blade edges, the said blades being progressive in their angularity from the front blade 63 to the rear blade 67 in the form of a spiral or screw, and the forward blade 63 will have greater and longer vibratory force contact with the bolls, plants or vines than the next blade 64 which is much less in its vibratory action by reason of the fact that when it comes into position for engagement with the bolls, plants or vines it will be horizontal or a little above horizontal, and consequently the time of contact thereof is less prolonged. The blades 65, 66 and 67 diminish gradually in time of vibratory contact with the bolls, plants or vines relatively to the more prolonged action of the preceding blades 63 and 64. The united weevil or bug removing action of the blades is that of a spiral operating sidewise relatively to the rows of plants or vines treated, or in a plane of rotation at right angles to the line of draft or propulsive movement of the machine. This spiral sweeping vibratory operation of the beater or the component blades of the latter on the bolls, plants or vines results in an effective elimination and destruction of the insects without subjecting the bolls, plants or vines to injury as in the case where a sharp blow or strong impact of a flat blade ensues. The blades 63 to 67 inclusive are all of uniform length and each is of concavo-convex form, the concave side of each blade being toward the plants or vines, or, constitutes the working face. These concave working faces operate to draw the bugs or insects inwardly toward the centers of the blades, and this operation, together with the overlap of the side edges of the blades fully from the supporting shaft therefor to the outer free ends thereof, prevents the bugs or insects from passing between the side edges of the blades and insures a delivery or discharge from the free ends of the blades. The overlap of the side edges of the blades fully from their supporting shaft to the free ends of the blades produces a gatherer or beater which is presented to the plants or vines as a continuous and unbroken revolving spiral or screw. The form of the beaters shown by Figs. 7, 8 and 9 will be progressively arranged on the beater shaft 35 at different angles so that the said modified form of the blades will be successively brought into engagement with the plants or vines. The blade 68, as shown by Figs. 7, 8 and 9, is particularly intended for use with potato vines or like small plants of tender growth, and each blade consists of a wire frame 69 having opposite spring coils 70 and a covering 71 of fabric or other material. These blades 68 have a spiral sweeping vibratory operation relatively to the vines or plants similar to the blades heretofore described, and the force of their impact or contact relatively to the vines or plants is reduced materially through a yielding action thereof due to the spring coils 70 and as a consequence tender vines or plants are prevented from being broken or injured by the said blade 68 and at the same time bugs or insects are thoroughly removed and destroyed by being thrown over against the shield, guard or fender 37 and thence falling into the fluid 44 in the compartments 43 of the trough 41.

From the foregoing the operation of the machine will be readily understood. The machine as a whole is suitably propelled adjacent to a row of cotton plants or vines and the clutch sleeve 23, which will have been adjusted to transmit the motion of the shaft 17 to the sleeve 20 and gear 19, will cause a continuous rotation of the beater shaft 35 and the beater embodying either form of components carried by said shaft through the gears 50 and 51, shaft 49 and either of the gears 52 or 53. To change the speed of rotation of the beater shaft 35 it is only necessary to shift the sleeve 54 and move the gear 51, the latter being held by a suitable setscrew and capable of being shifted on the end of its shaft 49 so as to effect a mesh and operation of the gears 51 and 53. This change in the gears may be readily accomplished either from a fast to a slow position or to change the speed of the shaft 35 in accordance with the character of the work to be done or the plants to be treated. As the bugs or insects are removed from the bolls, plants or vines, by the beater in either form they are thrown inwardly and downwardly against the shield, guard or fender 37 and then fall from the latter into the trough 41. The blades or components of the beater as shown by Figs. 7, 8 and 9 may be substituted for those shown by Figs. 1, 2, 3 and 4 and thereby readily adapt the machine for use with potato vines or other frail plants and, moreover, the bars or arms 31 may be adjusted to raise or lower the beater and correspondingly raise and lower the trough 41 and its support to accommodate plants of different heights. When the trough 41 is well filled with the gathered and destroyed bugs or insects it may be readily removed from its support 38 and emptied and such fluid 44 as may be remaining in the several compartments can be recovered and reused and where necessary the compartments 43 will be replenished with the fluid 44 and the trough 41 afterward reset in its support 38. In transporting the machine to and from the plants or vines or during the time that the operation of the beater is undesirable the clutch sleeve 23 may be readily detached from the sleeve 20 of the gear 19, thereby causing cessation of rotation of the beater. Furthermore, when the machine is backed the said clutch sleeve 23 will automatically release itself from the sleeve 20 and avoid any reversal of rotation of the beater, the said clutch sleeve also automatically restoring itself into engaging position with relation to the sleeve 20 when the machine is subsequently moved forward. This last automatic operation is very advantageous in view of the fact that there is no liability of breakage or injury of the beater components by sudden reversal or backing movement of the machine, and, moreover, the machine may be reset in a rearward direction, as it were, for instance to repeat the beating operation thereof relatively to certain plants or vines that may be discovered to need further treatment without requiring any particular attention or adjustment on the part of the operator.

What is claimed as new is:

1. In a machine of the class described, a frame, a gathering means held by and above the frame and projecting wholly beyond the frame side and comprising a rotary shaft, a plurality of blades successively arranged at different angles and having overlapping edges fully from their attachment to the shaft to their outer free ends to produce a spiral sweeping vibratory operation relatively to plants or vines in a sidewise direction to remove insects therefrom, a repository below the gathering means for receiving the insects removed from plants, and mechanism for operating the gathering means.

2. In a machine of the class described, gathering means comprising a rotary shaft and a plurality of blades successively arranged at different angles and having overlapping edges fully from their attachment to the shaft to their outer free ends and having a spiral sweeping vibratory action relatively to plants or vines.

3. In a machine of the class described, a frame, a gathering means held by and above the frame and projecting wholly beyond one side of the frame, said gathering means comprising a rotary shaft and a plurality of blades fixed to the shaft and successively arranged at different angles and of equal width from the shaft to their outer free ends, the edges of the blades also overlapping throughout their full length to produce a spiral sweeping vibratory operation relatively to plants or vines in a sidewise direction to remove insects therefrom, and a repository adjacent to said gathering means for receiving insects removed by the gathering means.

4. In a machine of the class described, a frame, a gathering means held by the frame and comprising a rotary shaft, a plurality of blades carried by the shaft and arranged at different angles to the shaft to form a spiral and having the side edges thereof successively overlapping throughout their full lengths from the shaft to the free ends of the blades and also provided with concave working faces to produce a spiral sweeping vibratory operation relatively to plants or vines to cause the insects to be drawn toward the center of the blades, and mechanism for operating the shaft.

5. Rotary gathering means for insect gathering machines comprising a shaft having a plurality of blades of equal length arranged in spiral form on the shaft with the side edges of the blades overlapping throughout the full lengths of the blades, the blades being formed with concave working faces.

6. In a machine of the class described, adjustable gathering means to operate upon plants or vines to remove insects therefrom, and a destructive repository carried by and unitedly adjustable with the said gathering means to vary the angle and inclination thereof, the repository comprising a removable trough with an upper open top portion and upwardly converging sides, the trough being divided at intervals by imperforate partitions to form separate compartments in which an insect destroying material is placed, the sides upwardly converging toward the open top preventing the insect destroying material in the trough from splashing over the sides of the trough due to the movement and tilting of the machine and the adjustment of the gathering means and trough.

7. In a machine of the class described, adjustable gathering means to operate upon plants or vines to remove insects therefrom, a support secured to and uniformly movable with the gathering means and comprising an upwardly extending fender having a downwardly and outwardly inclined contour and also provided with upwardly converged supporting devices, a trough removably mounted in the said supporting devices below the lower terminal of the fender and having an open top and opposite sides which are upwardly and regularly converged throughout their full length and corresponding to the upward convergence of the supporting devices, the trough being divided at intervals by imperforate partitions to form separate compartments to receive a destructive material, the trough having materially greater capacity toward the bottom thereof than at the upper portion, the lower extremity of the fender projecting over the upper edge of one side to deposit insects into the trough between the two sides, the upwardly converging sides of the trough confining the destructive material within the trough and preventing splashing of said material over the side edges of the trough from the compartments and also operating to render it more difficult for the insects deposited in the trough to crawl out of the latter.

In testimony whereof I have hereunto set my hand in presence of two subscribing witnesses.

FREDERICK STELLAR.

Witnesses:
CHAS. S. HYER,
S. E. WHITE.